Figure 1:
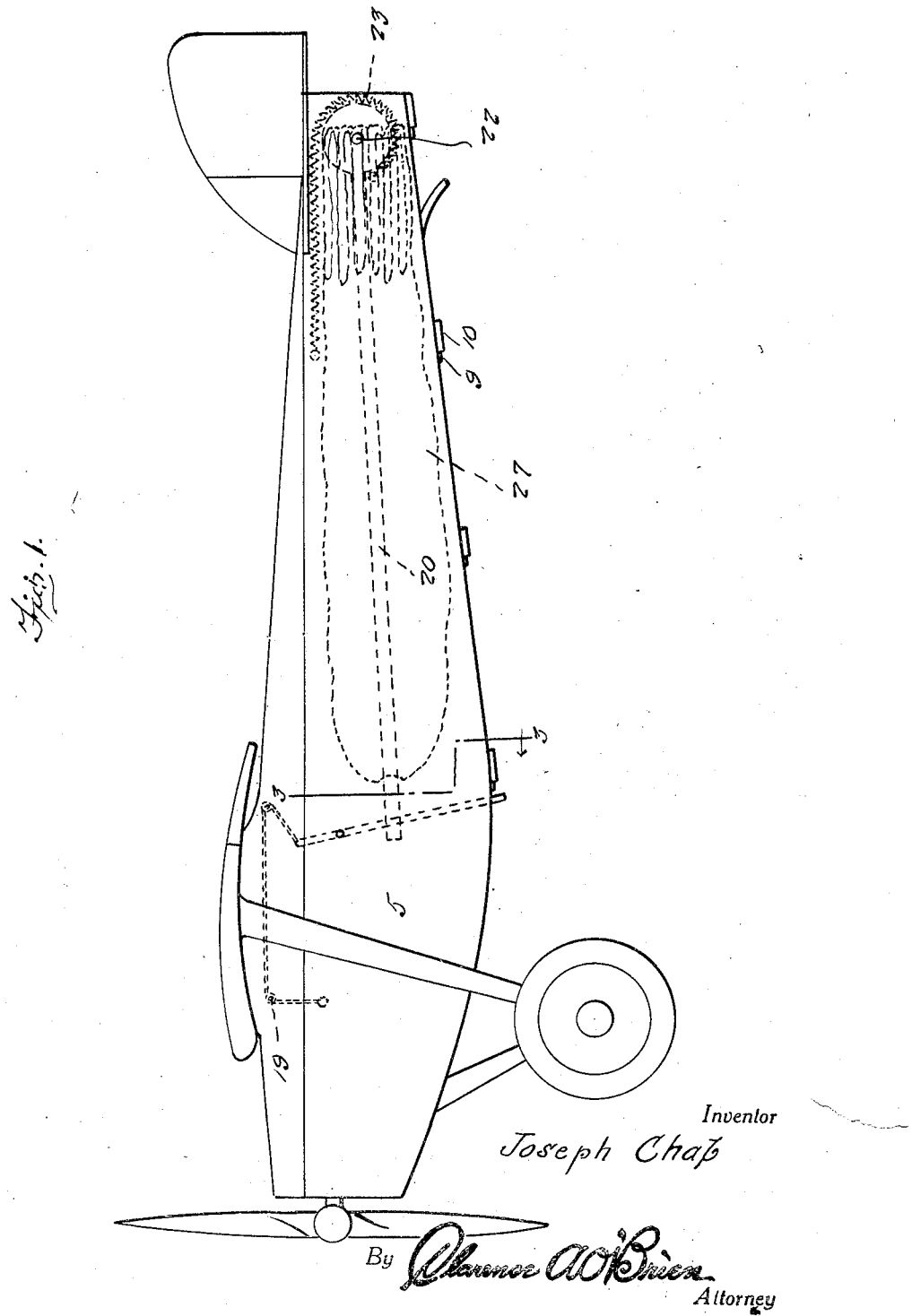

July 21, 1931.  J. CHAB  1,815,430
AEROPLANE PARACHUTE
Filed April 1, 1930  4 Sheets-Sheet 1

Inventor
Joseph Chab
By Clarence A. O'Brien
Attorney

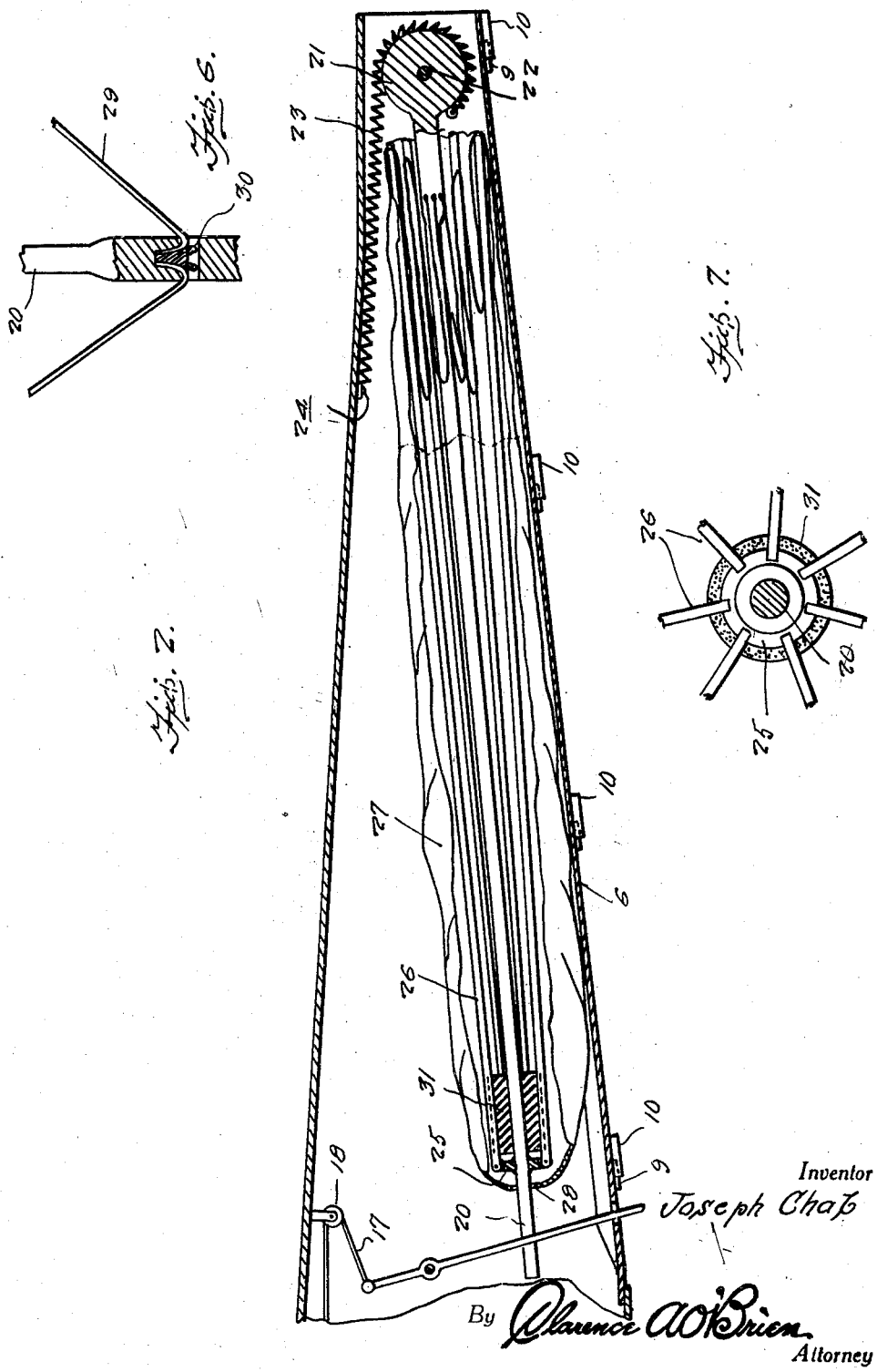

July 21, 1931. J. CHAB 1,815,430
AEROPLANE PARACHUTE
Filed April 1, 1930 4 Sheets-Sheet 3
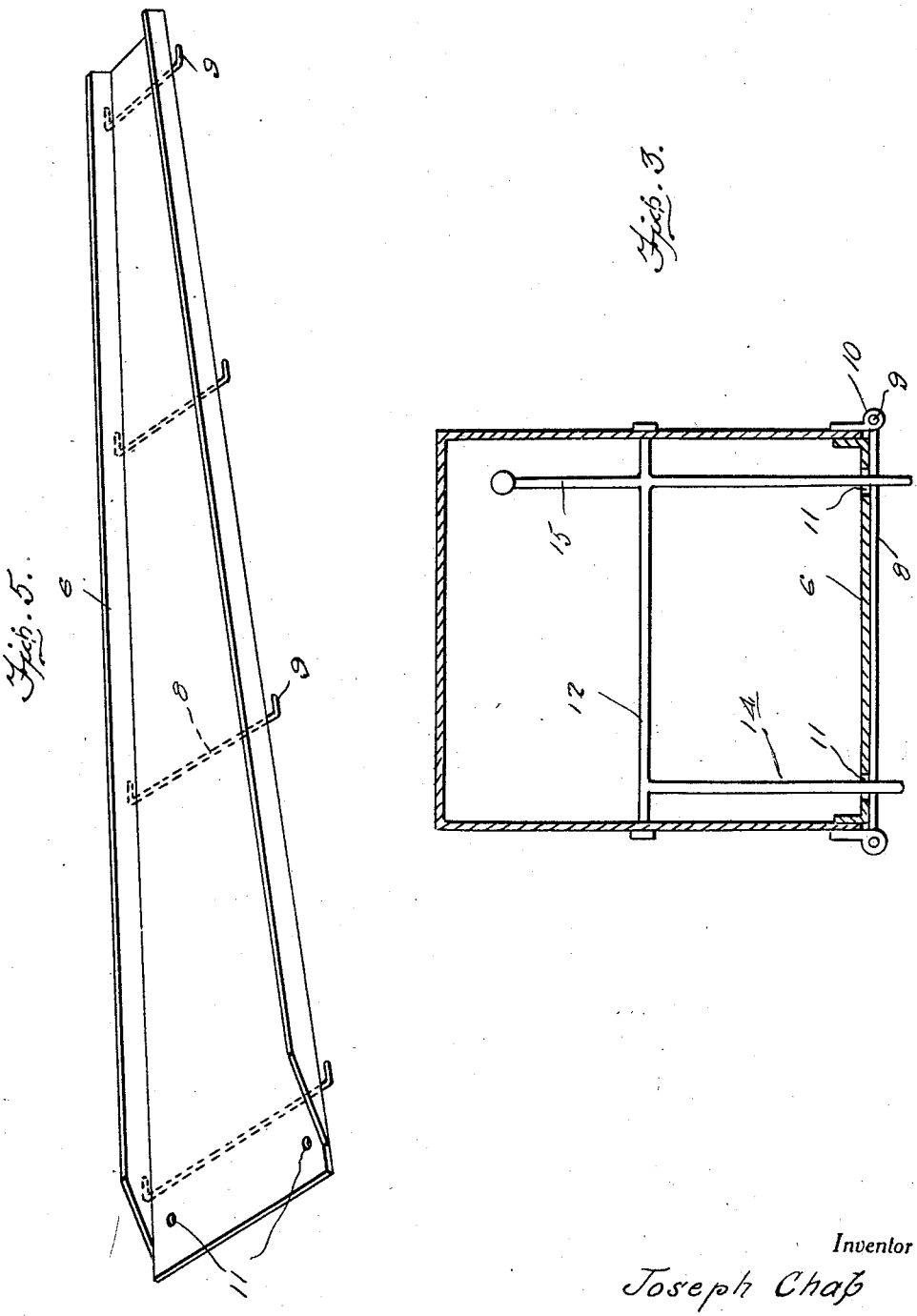
Inventor
Joseph Chab
By Clarence A O'Brien
Attorney

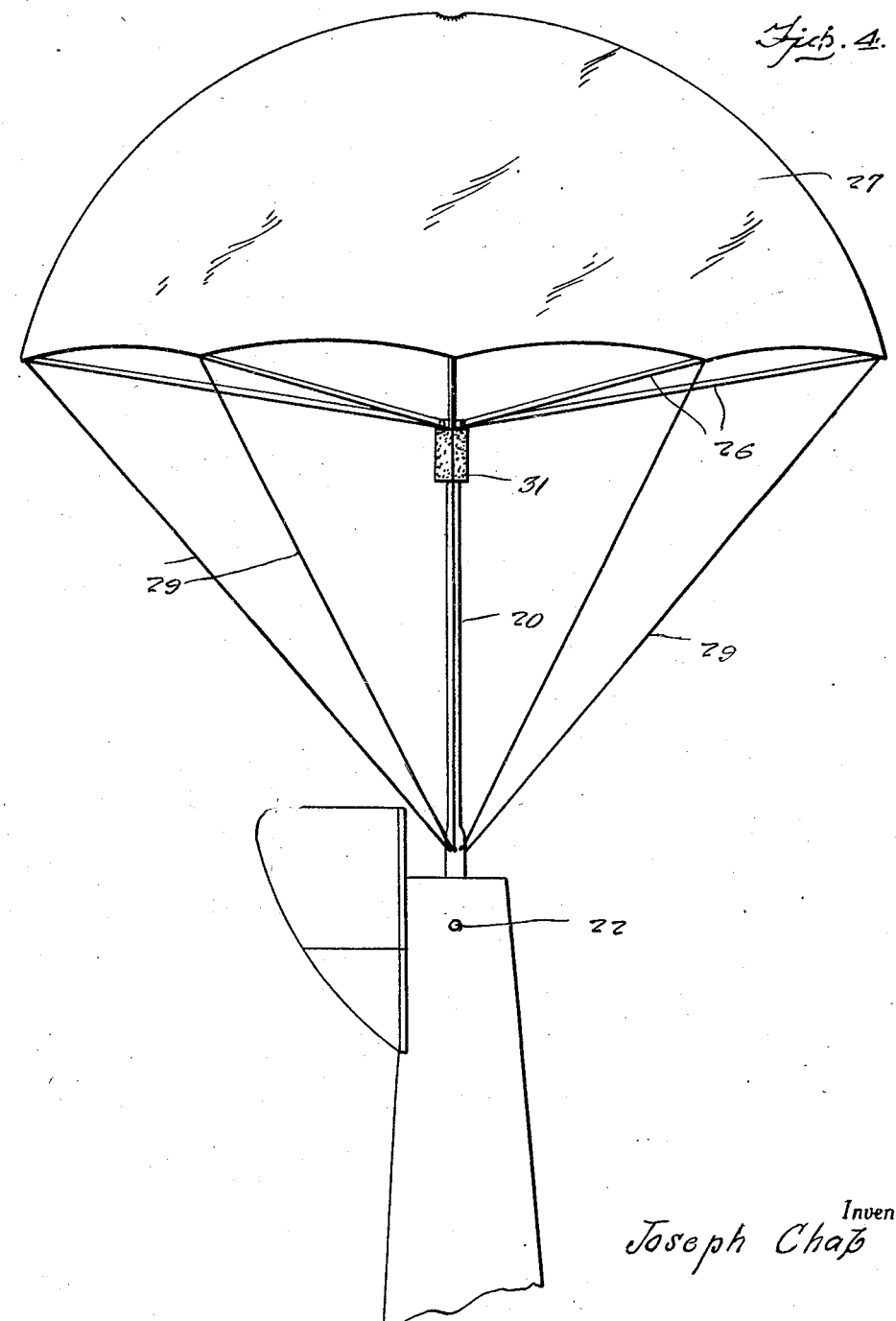

Patented July 21, 1931

1,815,430

UNITED STATES PATENT OFFICE

JOSEPH CHAB, OF DORCHESTER, NEBRASKA

AEROPLANE PARACHUTE

Application filed April 1, 1930. Serial No. 440,765.

The present invention relates to an aeroplane and has for its prime object to provide a parachute which is incorporated as a part of the aeroplane in combination with means whereby the parachute may be released for preventing the aeroplane from crashing to the ground or permitting it to come down slowly with safety to the occupant.

Another very important object of the invention resides in the provision of a parachute structure of this nature which is comparatively simple in its construction, compact and convenient in its arrangement of parts, thoroughly efficient and reliable in use, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of an aeroplane with my parachute structure incorporated therein, Figure 2 is a longitudinal vertical section through the tail portion thereof showing the parachute in a folded position, Figure 3 is a vertical transverse section taken substantially on the line 3—3 of Figure 1, Figure 4 is an elevation of the parachute extended, Figure 5 is a perspective view of the releasable bottom, Figure 6 is a detail sectional view through the parachute bar showing the brace cord anchored therein, and Figure 7 is a sectional view through the bar.

Referring to the drawings in detail it will be seen that the numeral 5 denotes a fuselage of an aeroplane, the tail of which, in the present embodiment, forms a compartment for the parachute but it is to be understood that other parts of the aeroplane may be used as a compartment or compartments may be specially built in the wings or the like.

The bottom of the tail portion of the fuselage is open and has a removable bottom 6 with upwardly extending side flanges 7. Cross rods 8 are secured on the bottom and have angular terminal extensions forming lugs 9 adapted to be received in sleeve pockets 10 mounted on the sides of the tail portion of the fuselage so that to release the bottom it must be moved forwardly to disengage the lugs 9 from the sleeve pockets.

The front portion of the bottom is provided with a pair of openings 11. A shaft 12 is rockably mounted across the fuselage and has a pair of crank arms 14 depending downwardly therefrom to extend through the openings 11. An upstanding crank 15 on the shaft 12 is connected with a cord 17 trained over a pulley 18 and extending forwardly into the cockpit over another pulley 19 so that by pulling this cord the crank arm 15 may be rocked rearwardly thereby rocking the shaft 12 to swing the arms 14 forwardly thereby sliding the bottom 6 forwardly to release the lugs 9 from the pocket sleeves 10 and allowing the bottom to drop freely.

A bar 20 has a disk 21 formed on one end which is rockable on a shaft 22 across the rear end of the tail of the fuselage. A spring 23 is anchored to the disk end 21 to extend thereabout and forwardly be anchored as at 24 to the tail of the fuselage and the spring normally has a tendency to swing the forward end of the bar downwardly after the bottom 6 has been let free.

A head 25 is mounted on the bar 20 adjacent the free end thereof and has a plurality of ribs 26 hingedly connected therewith. A parachute cover 27 has its edge secured to the ends of the ribs 26. In the center this cover is provided with an opening 28 through which the free end of the bar extends when the parachute is folded.

A plurality of cords 29 are anchored as at 30 in the bar adjacent the disk end 21 and are secured to the ends of the ribs so as to limit their swinging movement when the parachute is extended as shown in Figure 4.

Now with the parts folded and everything located as shown to advantage in Figure 2 it will be seen that when the bottom 6 is released the parachute bar actually will gravitate downwardly aided by the spring 23 and, of course, when the air is caught in the parachute cover 27 and the aeroplane starts to nose downwardly the parachute will come into play being fully expanded so as to permit the aeroplane to slowly descend. In order to assist in the outward swinging of the ribs when the parts are released there is provided on the bar adjacent the head 25 a rubber sleeve 31 which is slightly compressed when the ribs are folded so that when the parts are free the expansion of this rubber sleeve will assist in bringing the parachute into an expansive position for quick action.

It is thought that the construction, operation, utility and advantages of this invention will now be quite apparent to those skilled in this art without a more detailed description thereof.

The present embodiment of this invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination with an aeroplane having a compartment formed therein open at the bottom and the rear end, a bottom plate releasably mounted in the compartment, a bar pivoted in the rear end of the compartment, ribs hingedly mounted on the bar adjacent the free end thereof, a parachute cover having its edges secured to the ends of the ribs, cords secured to the ends of the ribs and to the bar adjacent the pivoted end thereof, the pivoted end of the bar having a disk formed thereon, a spring anchored to the disk and extending thereabout and anchored in the compartment and under tension to normally swing the bar out of the compartment when the bottom plate is released, said releasable means for holding the bottom in the compartment comprising sleeves on the fuselage and lugs on the bottom plate extending into the sleeves, and means for moving the bottom plate to release the lugs from the sleeves.

2. In combination with an aeroplane having a compartment formed therein and opened at the bottom of the fuselage, a parachute pivotally mounted in the compartment, a bottom plate mounted on the fuselage for closing the opening of said compartment, said cover plate being capable of shiftable movement longitudinally of the fuselage whereby said parachute will be free to swing outwardly of the compartment, means for shifting said bottom plate, said bottom plate being capable of complete disengagement from the fuselage when the bottom plate has been shifted a predetermined distance in one direction.

In testimony whereof I affix my signature.
JOSEPH CHAB.